US011054732B2

(12) United States Patent
Chang

(10) Patent No.: US 11,054,732 B2
(45) Date of Patent: Jul. 6, 2021

(54) WAVELENGTH CONVERSION MODULE, MANUFACTURING METHOD OF WAVELENGTH CONVERSION MODULE AND PROJECTION DEVICE

(71) Applicant: Coretronic Corporation, Hsin-Chu (JP)

(72) Inventor: Kuo-Chou Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 118 days.

(21) Appl. No.: 16/677,686

(22) Filed: Nov. 8, 2019

(65) Prior Publication Data
US 2020/0150517 A1    May 14, 2020

(30) Foreign Application Priority Data
Nov. 12, 2018  (CN) .......................... 201811339008.5

(51) Int. Cl.
  *G03B 21/20*  (2006.01)
  *H04N 9/31*  (2006.01)
  *G02B 5/02*  (2006.01)

(52) U.S. Cl.
  CPC ......... *G03B 21/204* (2013.01); *G02B 5/0242* (2013.01); *G02B 5/0284* (2013.01); *G03B 21/208* (2013.01); *H04N 9/3197* (2013.01)

(58) Field of Classification Search
  CPC .............. G03B 21/204; G03B 21/2013; G03B 21/2033; G03B 21/208; H04N 9/3158;
  (Continued)

(56) References Cited

U.S. PATENT DOCUMENTS

2015/0153487 A1\* 6/2015 Hua ...................... C09K 11/00
                                                                        359/871

FOREIGN PATENT DOCUMENTS

| CN | 105278225 | 1/2016 |
|---|---|---|
| CN | 103912848 | 7/2016 |

(Continued)

OTHER PUBLICATIONS

Office Action of China Counterpart Application, dated Mar. 23, 2021, pp. 1-7.

*Primary Examiner* — Ryan D Howard
(74) *Attorney, Agent, or Firm* — JCIPRNET

(57) ABSTRACT

A wavelength conversion module, a manufacturing method of wavelength conversion module and a projection device are provided. The wavelength conversion module includes a substrate, an anodized layer and a wavelength conversion layer. The anodized layer is located on the substrate, wherein the anodized layer has a rough surface. The anodized layer is located between the substrate and the wavelength conversion layer, and the rough surface faces the wavelength conversion layer. A projection device having aforesaid wavelength conversion module and a manufacturing method of aforesaid wavelength conversion module are also provided. The wavelength conversion module of the invention has good conversion efficiency and reliability. The projection device of the invention has good optical quality and reliability. The manufacturing method of the wavelength conversion module of the invention can form the wavelength conversion module with good conversion efficiency and reliability.

22 Claims, 9 Drawing Sheets

(58) Field of Classification Search
CPC .. H04N 9/3164; H04N 9/3161; H04N 9/3152; G02B 5/0242; G02B 5/0247; G02B 5/0284; G02B 5/021; G02B 5/0226; G02F 1/353
See application file for complete search history.

(56) References Cited

FOREIGN PATENT DOCUMENTS

| | | |
|---|---|---|
| CN | 104595852 | 8/2016 |
| CN | 206946178 | 1/2018 |
| CN | 207937746 | 10/2018 |
| CN | 209265073 | 8/2019 |
| TW | I526769 | 3/2016 |

\* cited by examiner

WAVELENGTH CONVERSION MODULE, MANUFACTURING METHOD OF WAVELENGTH CONVERSION MODULE AND PROJECTION DEVICE

CROSS-REFERENCE TO RELATED APPLICATION

This application claims the priority benefit of China application serial no. (201811339008.5 (DAS: B4B1)), filed on Nov. 12, 2018. The entirety of the above-mentioned patent application is hereby incorporated by reference herein and made a part of this specification.

BACKGROUND

1. Field of the Invention

The invention relates to an optical module, a manufacturing method thereof and an optical device including said optical module, and more particularly relates to a wavelength conversion module, a manufacturing of a wavelength conversion module and a projection device.

2. Description of Related Art

In recent yeas, projection devices based on solid-state light sources such as a light-emitting diode (LED) and a laser diode have gradually gained a place in the market. Since the laser diode has luminous efficiency higher than about 20%, in order to break through a light source limitation for the light emitting diode, a laser light source for exciting a phosphor to generate a neutral color light source required by projectors has been gradually developed. However, in general, a phosphor wheel in the existing projection devices is made by the phosphor mixed with an organic adhesive, an inorganic adhesive, a glass cement and then coated or attached onto a reflective layer of a reflective substrate, where a reflection efficiency of the reflective layer often affects optical wavelength conversion efficiency and brightness directly.

Further, a conventional process for the reflective substrate may be formed by adopting an organic adhesive, which is mixed with diffuse reflection particles (e.g., titanium oxide, aluminum oxide, barium sulfate, etc.), coated onto a substrate through printing, spraying, and dispensing processes and then cured through a heating process. However, the organic adhesive contained in the reflective layer has low resistance to high-power laser irradiation and the colloid characteristic prone to cracking and transmutation, and these problems will affect luminous efficiency and reliability of the phosphor wheel using the reflective substrate.

On the other hand, another conventional process for the reflective substrate can obtain the reflective layer with high temperature resistant by adopting the inorganic adhesive or the glass cement, which is mixed with diffuse reflection particles, coated onto a substrate and then cured by high temperature (greater than 400° C.). However, the process of manufacturing this kind of reflective layer for the reflective substrate is complicated, and yet the strength of the substrate therein is liable to be degraded by high temperature tempering. In addition, the reflective layer formed by the inorganic adhesive or the glass cement can easily include pores, which will reduce reflectance and affect luminous efficiency and reliability of the phosphor wheel using the reflective substrate.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a wavelength conversion module with good conversion efficiency and reliability.

The invention provides a projection device with good quality and reliability.

The invention provides a manufacturing method of a wavelength conversion module capable of forming the wavelength conversion module with good conversion efficiency and reliability.

Other objects and advantages of the invention can be further illustrated by the technical features broadly embodied and described as follows.

To achieve one, a part, or all of the objects or other objects, an embodiment of the invention proposes a wavelength conversion module. The wavelength conversion module includes a substrate, an anodized layer and a wavelength conversion layer. The anodized layer is located on the substrate, wherein the anodized layer has a rough surface. The wavelength conversion layer is formed on the rough surface. The anodized layer is located between the substrate and the wavelength conversion layer, and the rough surface faces the wavelength conversion layer.

To achieve one, a part, or all of the objects or other objects, an embodiment of the invention proposes a projection device. The projection device includes aforesaid wavelength conversion module, an excitation light source, a light valve and a projection lens. The excitation light source is configured to emit an excitation beam, wherein the excitation beam is transmitted to the wavelength conversion module and converted into an illumination beam by the wavelength conversion module. The light valve is located on a transmission path of the illumination beam, and configured to convert the illumination beam into an image beam. The projection lens is located on a transmission path of the image beam and configured to convert the image beam into a projection beam.

To achieve one, a part, or all of the objects or other objects, an embodiment of the invention proposes a manufacturing method of a wavelength conversion module, which includes the following steps. An anodized layer is formed on a substrate, wherein the anodized layer has a rough surface. A wavelength conversion layer is formed on the rough surface, wherein the anodized layer is located between the substrate and the wavelength conversion layer, and the rough surface faces the wavelength conversion layer.

Based on the above, the embodiments of the invention have at least one of the following advantages and effects. In the embodiments of the invention, by disposing the rough surface of the anodized layer on the wavelength conversion module, reflectance, heat resistance and reliability of the wavelength conversion module may all be taken into account. On the other hand, in the embodiments of the invention, the projection device adopts the wavelength conversion module in which the reflective layer is formed by a process with no gelatinization. Therefore, the risk of deterioration and burn-out on the organic bonding material due to poorly withstanding to high temperature may be avoided so good optical quality and reliability can both be taken into account. In addition, according to the manufacturing method of the wavelength conversion module in the embodiments of the invention, by forming the rough surface of the anodized layer to allow the diffuse reflection particles be embedded therein, the reflective layer of the wavelength conversion module may then be manufactured by the process with no gelatinization to take both good reliability and conversion efficiency into account.

To make the above features and advantages of the invention more comprehensible, several embodiments accompanied with drawings are described in detail as follows.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
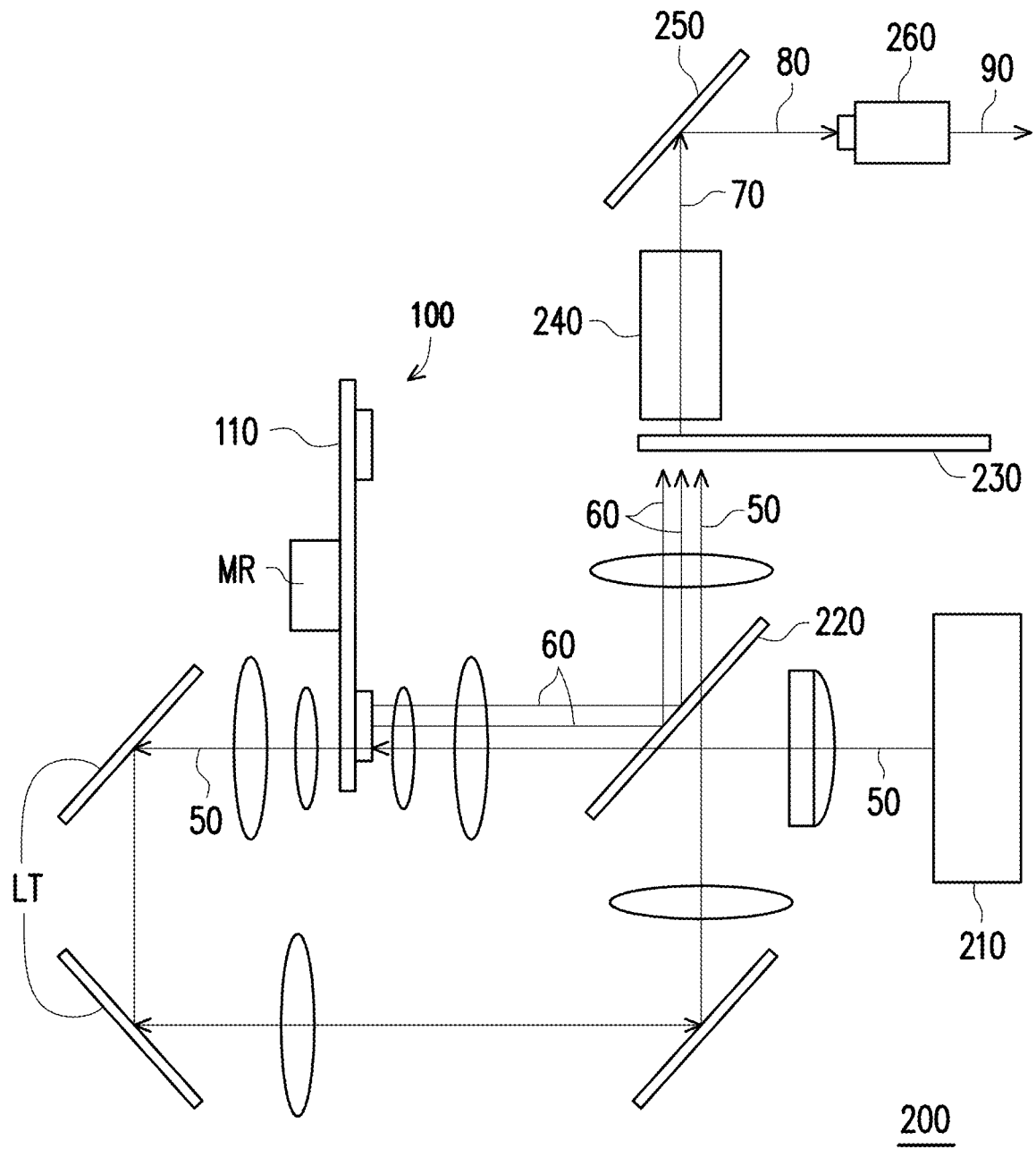
FIG. 1 is a schematic structure diagram of a projection device in an embodiment of the invention.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
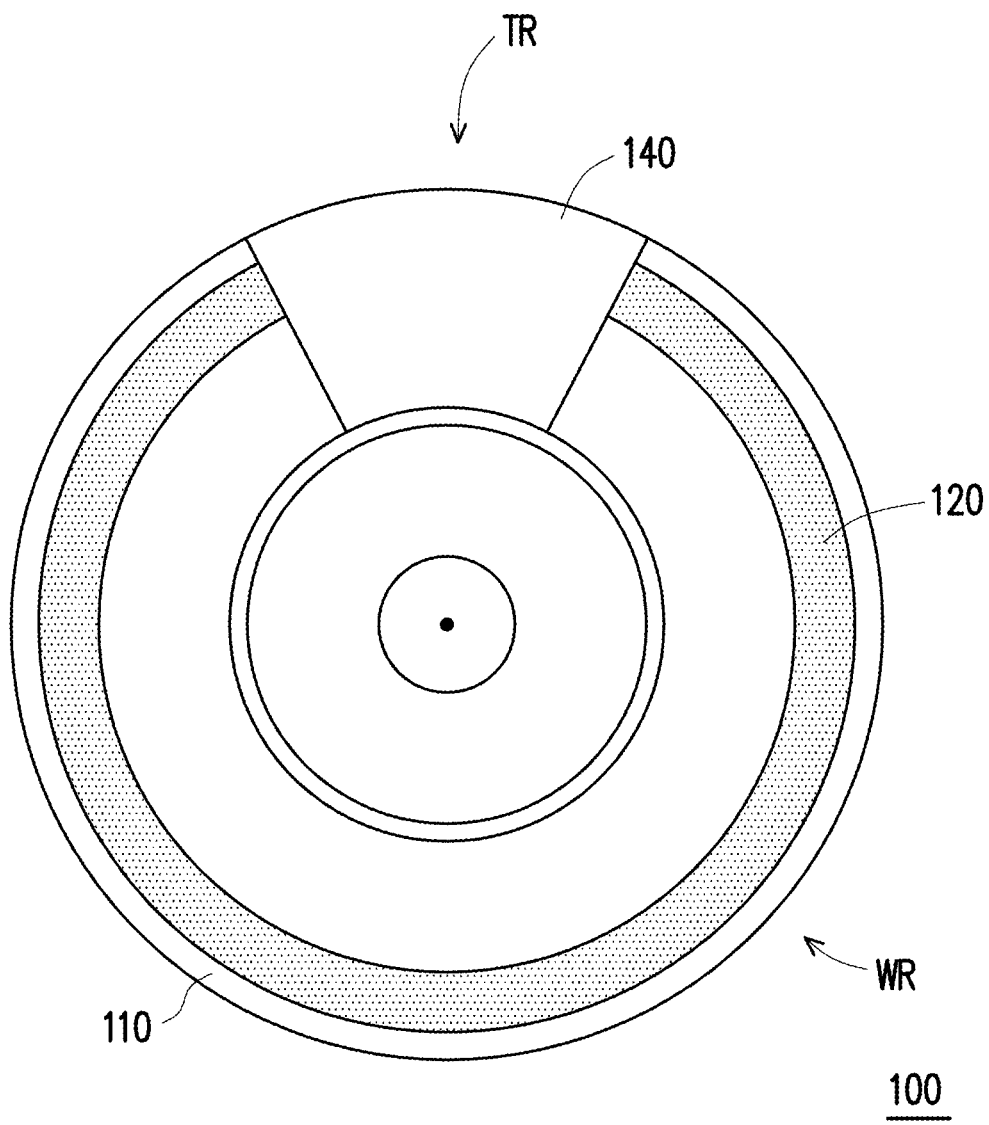
FIG. 2A is a top view of a wavelength conversion module of FIG. 1.
Figure 2B:
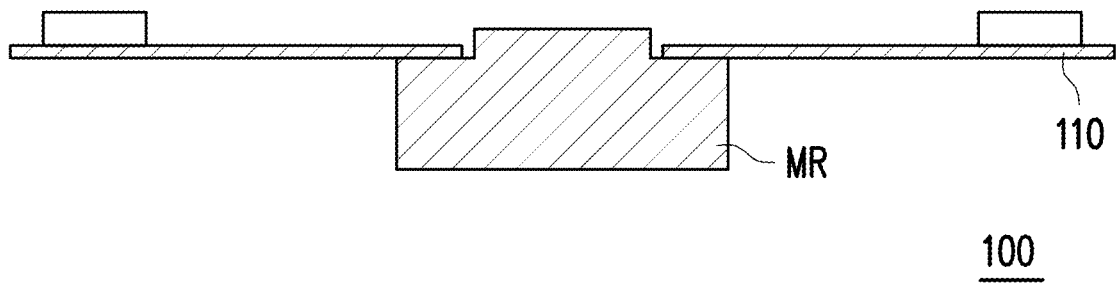
FIG. 2B is a cross-sectional view of the wavelength conversion module of FIG. 2A.
Figure 2C:
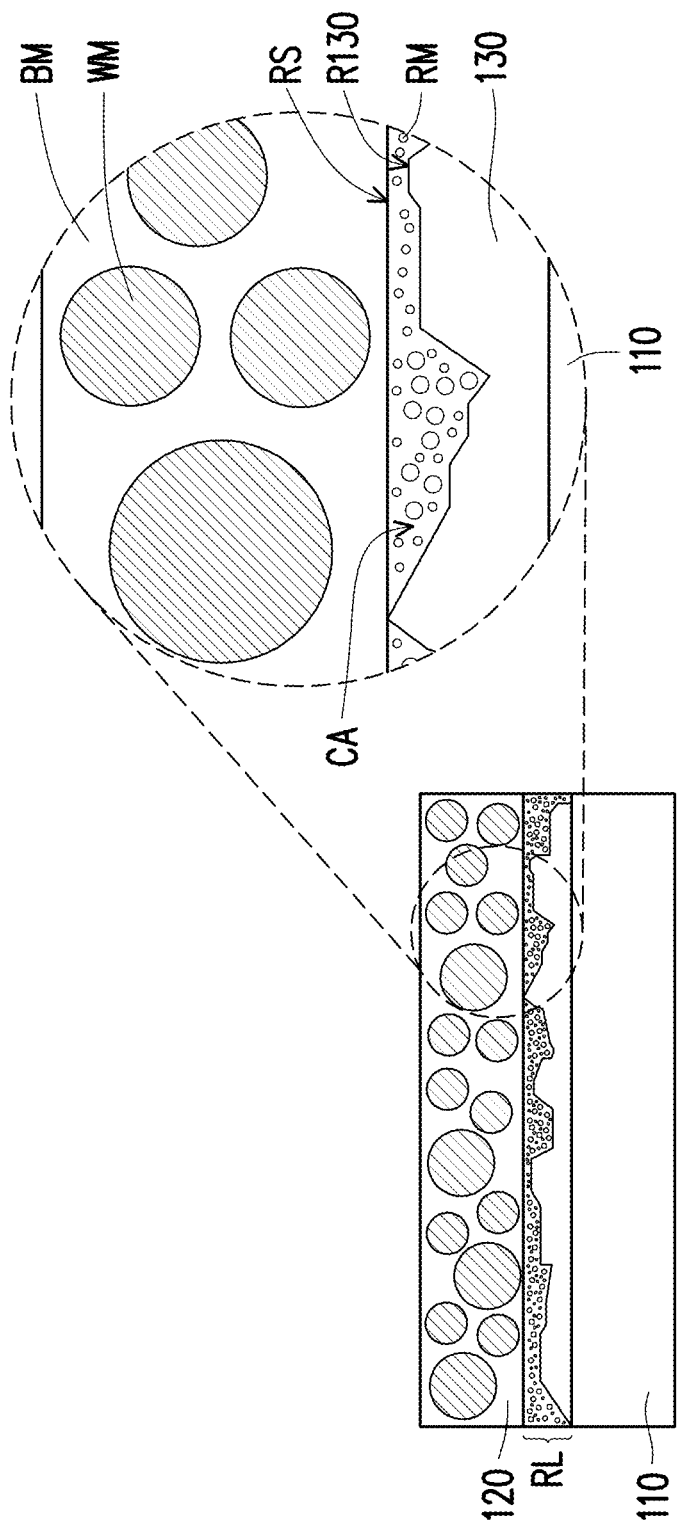
FIG. 2C is a partial enlarged view of the wavelength conversion module of FIG. 2B.

FIG. 1 is a schematic structure diagram of a projection device in an embodiment of the invention. FIG. 2A is a top view of a wavelength conversion module of FIG. 1. FIG. 2B is a cross-sectional view of the wavelength conversion module of FIG. 2A. FIG. 2C is a partial enlarged view of the wavelength conversion module of FIG. 2B. With reference to FIG. 1 to FIG. 2C, a projection device 200 includes an excitation light source 210, a light splitting unit 220, a wavelength conversion module 100, a light valve 250 and a projection lens 260. For instance, in this embodiment, the light valve 250 is, for example, a digital micro-mirror device (DMD) or a liquid-crystal-on-silicon panel (LCOS panel). However, in other embodiments, the light valve 250 may also be a transmissive liquid crystal panel or other beam modulators.

For instance, as shown by FIG. 1, in this embodiment, the excitation light source 210 is configured to emit an excitation beam 50. In this embodiment, the excitation light source 210 is a laser light source, and the excitation beam 50 is a blue laser beam. For instance, the excitation light source 210 may include a plurality of blue laser diodes arranged in an array (not illustrated), but the invention is not limited thereto.

Specifically, as shown by FIG. 1, in this embodiment, the light splitting unit 220 is disposed on a transmission path of the excitation beam 50, and located between the excitation light source 210 and the wavelength conversion module 100. Specifically, the light splitting unit 220 may be a partially transmissive and partially reflective element, a dichroic element, a polarization light splitting element or other elements capable of splitting beam. For instance, in this embodiment, the light splitting unit 220 can, for example, allow the blue light beam to pass through, and reflect beams in other colors (e.g., red, green, yellow, etc.). In other words, the light splitting unit 220 can allow the blue excitation beam 50 to pass through, so the excitation beam 50 can pass through the light splitting unit 220 and enter the wavelength conversion module 100.

As shown by FIG. 1, in this embodiment, the wavelength conversion module 100 is located on the transmission path of the excitation beam 50. Further, as shown by FIG. 2A and FIG. 2B, in this embodiment, the wavelength conversion module 100 includes at least one wavelength conversion region WR and a transmissive region TR. For instance, as shown by FIG. 1 to FIG. 2B, the at least one wavelength conversion region WR of the wavelength conversion module 100 is configured to convert the excitation beam 50 into at least one wavelength converted beam 60, and the transmissive region TR of the wavelength conversion module 100 is configured to allow the excitation beam 50 to pass through and be transmitted to subsequent optical elements.

More specifically, as shown by FIG. 2A to FIG. 2C, in this embodiment, the wavelength conversion module 100 includes a substrate 110, an anodized layer 130 and a wavelength conversion layer 120. The anodized layer 130 is located on the substrate 110, and located between the substrate 110 and the wavelength conversion layer 120. The anodized layer 130 is not disposed on the transmissive region TR. As shown by FIG. 2A to FIG. 2C, in this embodiment, the anodized layer 130 has a rough surface R130, and the rough surface R130 faces the wavelength conversion layer 120 and provides function of diffusely reflecting external light. In this embodiment, a material of the substrate 110 may include aluminum, magnesium or a compound thereof, and a material of the anodized layer 130 may include an aluminum oxide. However, the invention is not limited in this regard. For instance, in this embodiment, a thickness of the anodized layer 130 is between 20 μm and 100 μm. It should be noted that the numerical ranges are intended to be illustrative only and are not intended to limit the invention.

Specifically, as shown by FIG. 2C, the wavelength conversion layer 120 is located on the substrate 110, disposed corresponding to the at least one wavelength conversion region WR, and includes a wavelength conversion material WM and a bonding material BM, wherein the wavelength conversion material WM is distributed in the bonding material BM. More specifically, as shown by FIG. 2C, the wavelength conversion module 100 further includes a plurality of diffuse reflection particles RM, which are located between the wavelength conversion material WM and the substrate 110. These diffuse reflection particles RM are located between the anodized layer 130 and the wavelength conversion layer 120, and embedded in the anodized layer 130. For instance, in this embodiment, a plurality of micro pores CA are provided on the rough surface R130 of the anodized layer 130, and these diffuse reflection particles RM are filled in these micro pores CA of the anodized layer 130. For instance, in this embodiment, a surface roughness (Ra) of the rough surface R130 ranges between 2 μm and 20 μm, and a particle size of each particle among the diffuse reflection particles RM is between 10 nm and 20 μm. It should be noted that the numerical ranges are intended to be illustrative only and are not intended to limit the invention.

In this way, the diffuse reflection particles RM also form a diffuse reflection surface RS on the anodized layer 130. Further, the diffuse reflection surface RS faces the wavelength conversion layer 120 and also provides function of reflecting diffusely external light. Moreover, in this embodiment, although a structure of the rough surface R130 of the anodized layer 130 is exemplified by having the micro pores CA, the invention is not limited thereto. In other embodiments, the anodized layer 130 may also be a porous structure having a plurality of gaps. Further, after being filled in these gaps of the porous structure, the diffuse reflection particles RM also form the diffuse reflection surface RS on the anodized layer 130, and the diffuse reflection surface RS faces the wavelength conversion layer 120.

On the other hand, more specifically, in this embodiment, these diffuse reflection particles RM can increase bonds between each other and increase bonds with the anodized layer 130 by an inorganic bonding material. The inorganic bonding material is, for example, a bonding adhesive. The bonding effect can be achieved without using the inorganic bonding material much. The inorganic bonding material is used to increase bonds between the diffuse reflection particles RM and bonds between the diffuse reflection particles RM and the anodized layer 130 so the diffuse reflection particles RM cannot fall off easily. However, the invention is not limited in this regard. In other embodiments, it is also possible that the inorganic bonding material is not added. Accordingly, the wavelength conversion module 100 can form a reflective layer RL composed of the anodized layer 130 and the diffuse reflection particles RM by an process with no gelatinization.

In this way, as shown by FIG. 1 an FIG. 2C, in this embodiment, when being transmitted to the wavelength conversion module 100, the excitation beam 50 may be reflected by the anodized layer 130 and the diffuse reflection particles RM after passing through the wavelength conversion layer 120 so the wavelength conversion module 100 can provide good reflectance. Also, in this embodiment, by disposing of the anodized layer 130 on the wavelength conversion module 100, the diffuse reflection surface RS composed of the diffuse reflection particles RM may be formed by adopting the process with no gelatinization. Therefore, the risk of deterioration and burn-out on the organic bonding material due to poorly withstanding high temperature may be avoided so good optical quality and reliability can both be taken into account. In other words, in this embodiment, by disposing the anodized layer 130 on the wavelength conversion module 100, reflectance, heat resistance and reliability of the wavelength conversion module 100 may all be taken into account.

On the other hand, as shown by FIG. 2A and FIG. 2B, in this embodiment, the substrate 110 of the wavelength conversion module 100 has a hollow region (not marked), which is a region disposed corresponding to the transmissive region TR. Also, the wavelength conversion module 100 further includes a diffuser 140, which is disposed corresponding to the transmissive region TR and the hollow region (not marked) of the substrate 110. In other words, in this embodiment, the wavelength conversion module 100 is a transmissive wavelength conversion module, and the transmissive region TR is configured to allow the excitation beam 50 to pass through.

In this way, referring to FIG. 1, FIG. 2A and FIG. 2B again, in this embodiment, the wavelength conversion module 100 further includes a first driving device MR, which is configured to allow the transmissive region TR and the at least one wavelength conversion region WR to enter an irradiation range of the excitation beam 50 at different times, so as to selectively allow the excitation beam 50 to pass through or to be converted into the least one wavelength converted beam 60. As shown by FIG. 1, in this embodiment, when the transmissive region TR of the wavelength conversion module 100 enters the irradiation range of the excitation beam 50, the excitation beam 50 passes through the wavelength conversion module 100 and be transmitted to a filter module 230 through a light transmission module LT. On the other hand, in this embodiment, when the at least one wavelength conversion region WR enters the irradiation range of the excitation beam 50, the excitation beam 50 is converted into the at least one wavelength converted beam 60 by the at least one wavelength conversion region WR. Afterwards, as shown by FIG. 1, the at least one wavelength converted beam 60 from the wavelength conversion module 100 may be guided to the light splitting unit 220, and reflected to the subsequent filter module 230.

Specifically, as shown by FIG. 1, the projection device 200 further includes the filter module 230. The filter module 230 is located on the transmission path of the excitation beam 50 and the wavelength converted beam 60, and includes a filter region (not illustrated) and a transparent region (not illustrated). The filter module 230 further includes a second driving device (not illustrated), which is configured to make the filter region (not illustrated) enter an irradiation range of the wavelength converted beam 60 at different times, so as to form a red color light and a green color light, respectively. On the other hand, the transparent region (not illustrated) is also correspondingly transmitted into the irradiation range of the excitation beam 50 of the filter region 230 at different times, so as to form a blue color light. Accordingly, the excitation beam 50 and the wavelength converted beam 60 may be sequentially converted into an illumination beam 70 having a plurality of different colors.

On the other hand, as shown by FIG. 1, in this embodiment, the projection device 200 further includes a light homogenizing element 240, which is located on a transmission path of the illumination beam 70. In this embodiment, the light homogenizing element 240 includes an integration rod, but the invention is not limited thereto. More specifically, a shown by FIG. 1, when the illumination beam 70 is transmitted to the light homogenizing element 240 through an illumination system, the light homogenizing element 240 can homogenize the illumination beam 70 and then transmit it to the light valve 250.

Next, as shown by FIG. 1, the light valve 250 is disposed on the transmission path of the illumination beam 70, and configured to convert the illumination beam 70 into an image beam 80. The projection lens 260 is located on a transmission path of the image beam 80 and configured to convert the image beam 80 into a projection beam 90 and project the image beam 80 to a screen (not illustrated) so as to form images. After the illumination beam 70 is converged onto the light valve 250, the light valve 250 converts the illumination beam 70 with different colors in sequence into the image beam 80 with different colors in sequence and transmits the image beam 80 to the projection lens 260, and thus the image frames projected by the image beam 80 converted by the light valve 250 may become color images.

Figure 3:
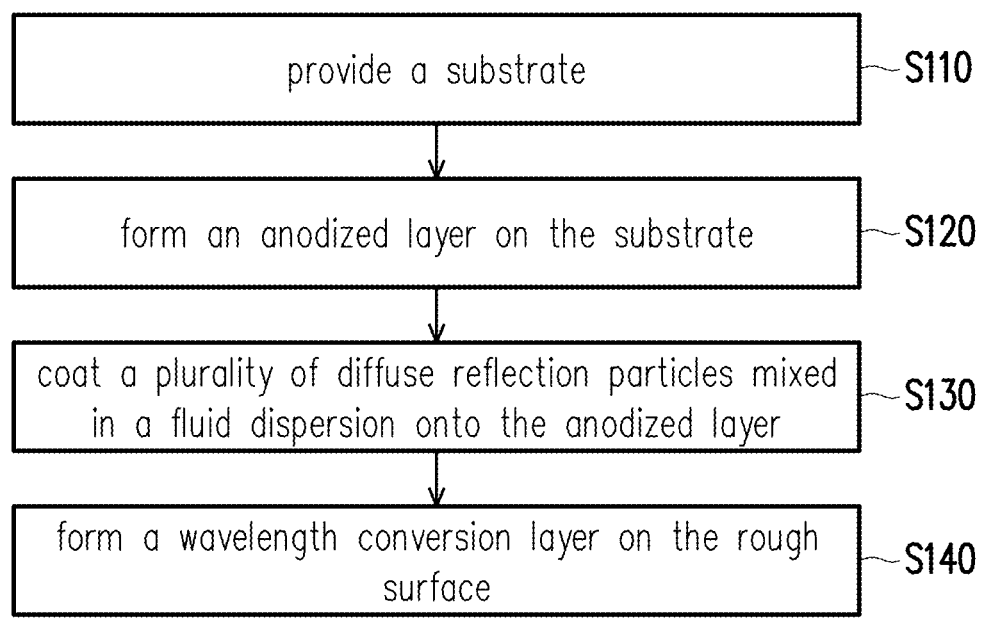
FIG. 3 is a flowchart of a manufacturing method of a wavelength conversion module in an embodiment of the invention.
Figure 4A:
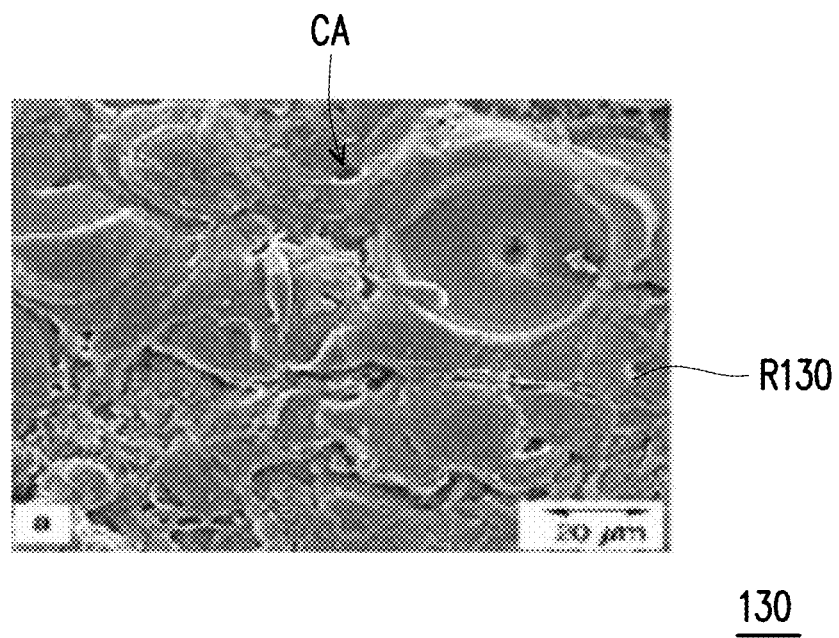
FIG. 4A and FIG. 4B are top views of different anodized layers in an embodiment of the invention.
Figure 4B:
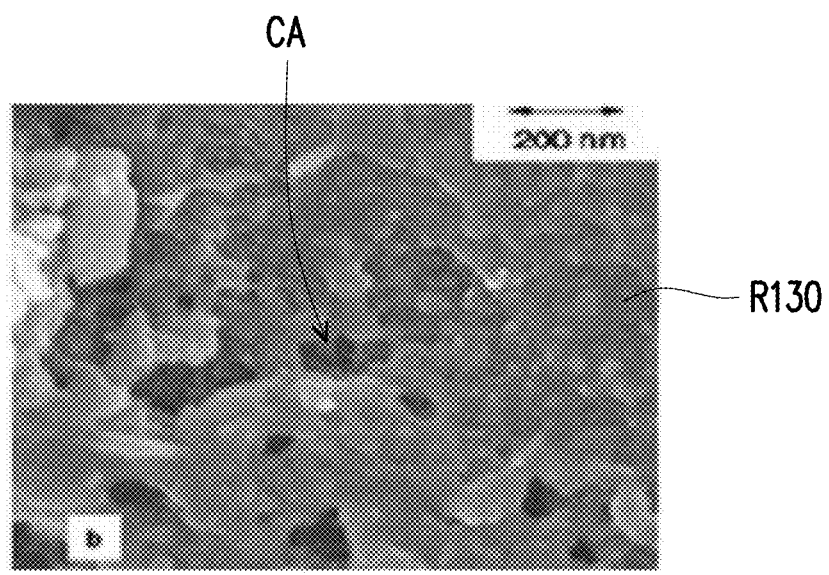
Figure 4C:
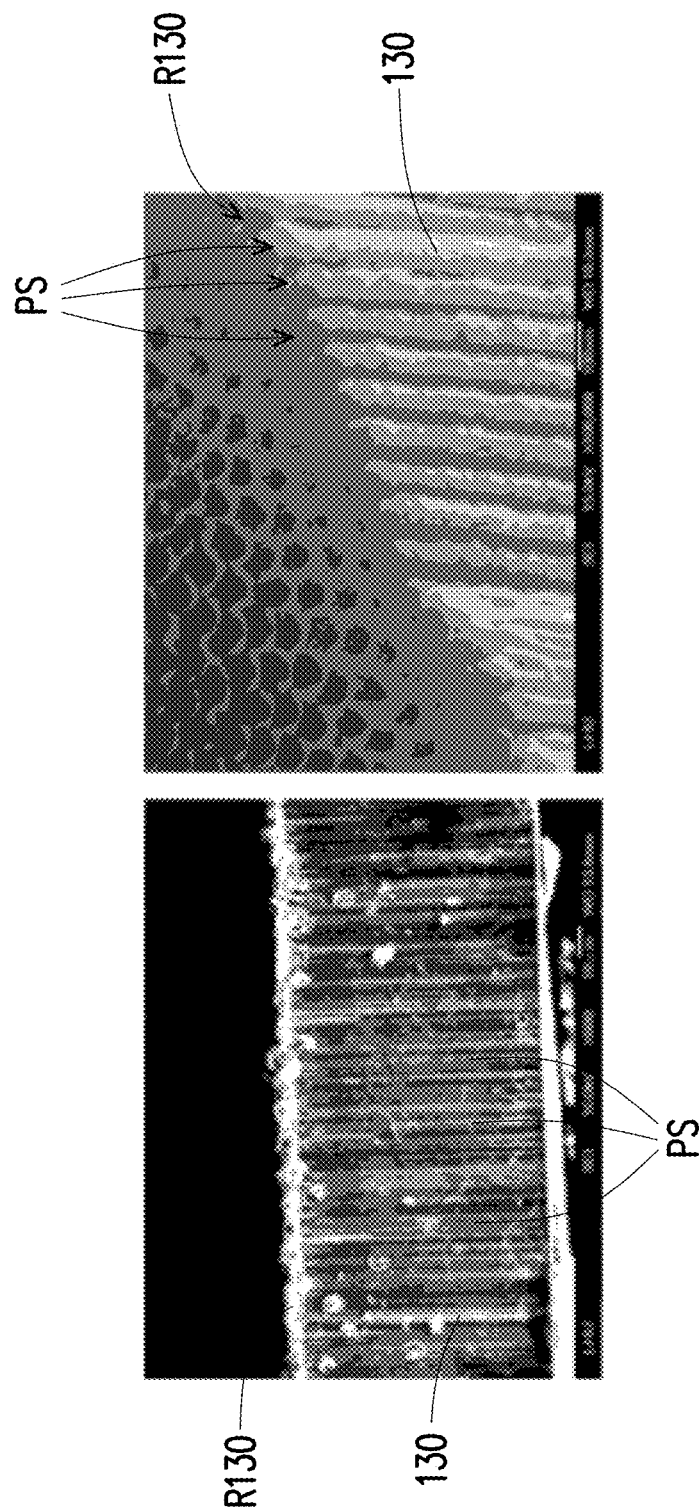
FIG. 4C is a cross-sectional image of another anodized layer in an embodiment of the invention.

FIG. 3 is a flowchart of a manufacturing method of a wavelength conversion module in an embodiment of the invention. FIG. 4A and FIG. 4B are top views of different anodized layers in an embodiment of the invention. FIG. 4C is a cross-sectional image of another anodized layer in an embodiment of the invention. With reference to FIG. 1, first of all, step S110 is executed to provide a substrate 110. Next, step S120 is executed to form an anodized layer 130 on the substrate 110. For instance, a method for forming the anodized layer 130 on the substrate 110 includes a micro-arc oxidation process, a plasma electrolytic oxidation process or an anodizing process, and the anodized layer 130 formed thereby includes a rough surface R130.

For instance, with the plasma electrolytic oxidation process taken as an example, a method for executing step S120 may be placing the substrate 110 into an electrolytic solution, applying a low voltage to form a basal anodized layer, then increasing the voltage, and thus generating a high voltage arc spark on a surface of the basal anodized layer through a strong voltage to change the surface's structure, so as to form the anodized layer 130 and the rough surface R130 thereof shown by FIG. 4A. On the other hand, with the micro-arc oxidation process taken as an example, as similar to the plasma electrolytic oxidation process, the method for executing step S120 also has the control agent from the low voltage to the high voltage, but it is using an arc discharge to enhance and activate the reaction on the anode. Accordingly, the anodized layer 130 with a high quality reinforced ceramic membrane structure and the rough surface R130 thereof may then be formed on the substrate 110, as shown by FIG. 4B. As shown by FIG. 4A and FIG. 4B, in this embodiment, there are a plurality of micro pores CA on the rough surface R130. For instance, a surface roughness (Ra) of the rough surface R130 ranges between 2 μm and 20 μm. It should be noted that the numerical ranges are intended to be illustrative only and are not intended to limit the invention.

On the other hand, although a structure of the rough surface R130 of the anodized layer 130 is exemplified by having the micro pores CA, the invention is not limited thereto. In other embodiments, the anodized layer 130 may also be a porous structure PS having a plurality of gaps. For instance, the method for executing step S120 may also be the anodizing process. When the anodized layer 130 is formed on the substrate 110 by the anodizing process, the substrate 110 needs to be placed in an electrolytic solution and applied with the low voltage, but it is not necessary to increase the voltage as in the plasma electrolytic oxidation process and the micro-arc oxidation process. In addition, by selecting a suitable electrolyte composition and controlling a current density, the anodized layer 130 may be formed as the porous structure PS having the gaps shown by FIG. 4C. In this way, the anodized layer 130 and the rough surface R130 thereof may also be formed. Specifically, each of the gaps of the porous structure PS shown by FIG. 4C forms a hollow tubular structure. In other words, the porous structure PS forms a plurality of the hollow tubular structures. Under ideal conditions, the hollow tubular structures of the porous structure PS are arranged in an array, each of the hollow tubular structures extends straightly, and a cross section of each of the hollow tubular structures is a hexagon. However, in actual operations, the hollow tubular structures of the porous structure PS may not be neatly arranged like an array. Rather, each of the hollow tubular structures may be extended in a skewed pattern, and may also be formed into a hollow tubular shape branch. In that case, a cross section of each of the hollow tubular structures may be a shape closer to a circle.

Next, with reference to FIG. 3, step S130 is executed to coat a plurality of diffuse reflection particles RM mixed in a fluid dispersion onto the anodized layer 130 such that these diffuse reflection particles RM are embedded in the anodized layer 130. Specifically, in this embodiment, since the fluid state formed by adding the fluid dispersion can help to disperse the diffuse reflection particles RM, the diffuse reflection particles RM may be embedded in the anodized layer 130 smoothly. Afterwards, the fluid dispersion and the diffuse reflection particles RM are heated to remove the fluid dispersion such that the diffuse reflection particles RM form a diffuse reflection surface RS on the anodized layer 130.

Next, with reference to FIG. 3, step S140 is executed to form a wavelength conversion layer 120 on the rough surface R130. The anodized layer 130 is located between the substrate 110 and the wavelength conversion layer 120, and the rough surface R130 of the anodized layer 130 and the diffuse reflection surface RS both face the wavelength conversion layer 120. For instance, in this embodiment, a method for forming the wavelength conversion layer 120 includes coating a mixture formed by a wavelength conversion material WM and a bonding material BM onto the substrate 110. Next, the wavelength conversion material WM and the bonding material BM are then solidified. Accordingly, a structure of the wavelength conversion module 100 in FIG. 2A to FIG. 2C may then be formed.

Test data of the wavelength conversion modules in the comparative example and the embodiments will be described below. However, the invention is not limited to the data listed below. It should be known to those ordinary skilled in the art that various modifications and variations can be made to the structure of the present invention without departing from the scope or spirit of the invention.

Figure 5:
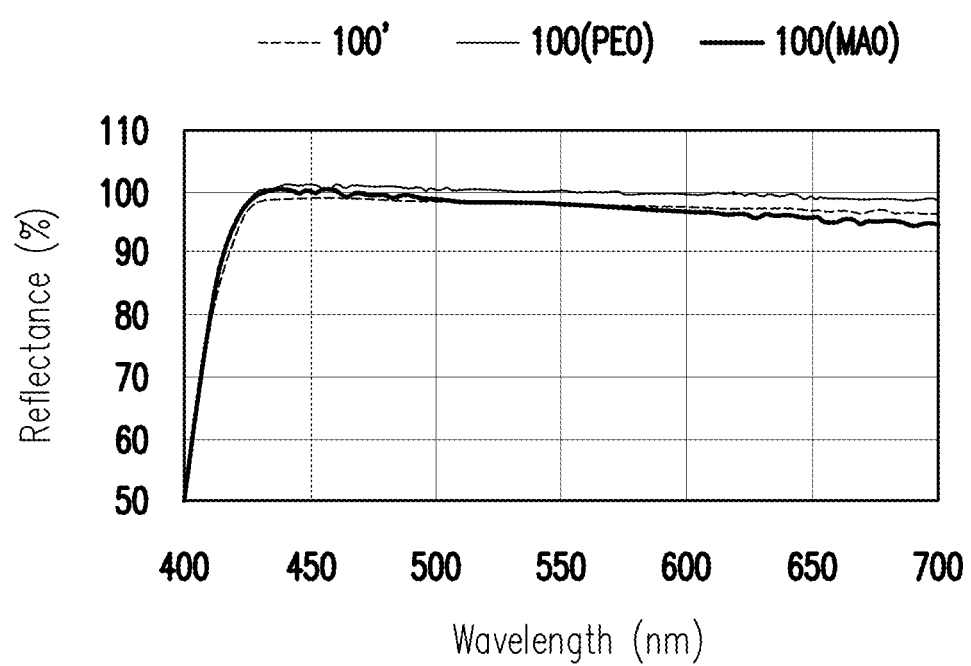
FIG. 5 is a curve graph illustrating test data of light in different wavelength ranges versus reflectance measured by the wavelength conversion modules in various embodiments and a comparative example of the invention.

FIG. 5 is a curve graph illustrating test data of light in different wavelength ranges versus reflectance measured by the wavelength conversion modules in different embodiments and the comparative example of the invention. On the other hand, data under "Threshold voltage intensity" listed in Table 1 below refers a required current intensity for forming the excitation beam capable of burning out and blackening the wavelength conversion module, and data under "Reflectance" in Table 1 refers a proportion (in percentage) of light with the wavelength of 550 nm that can be reflected by the wavelength conversion modules. With reference to Table 1, in the comparative example, a wavelength conversion module 100' has a reflective layer RL composed of diffuse reflection particles RM formed on a substrate having a flat surface by an organic bonding material (e.g., a silica gel). Test data results of the wavelength conversion module 100' are shown by the first row next to the comparative example in Table 1. On the other hand, test data results of the wavelength conversion module 100 are shown by the rest of rows in Table 1.

TABLE 1

| Test Sample | Test item | |
| --- | --- | --- |
| | Reflectance | Threshold current intensity |
| Wavelength conversion module 100' | 97.8% | 1.6 Amperes |
| Wavelength conversion module 100 formed by plasma electrolytic oxidation (PEO) process | 100% | greater than 3 Amperes |
| Wavelength conversion module 100 formed by micro-arc oxidation (MAO) process | 97.3% | greater than 3 Amperes |

Specifically, as shown by FIG. 5 and Table 1, as compared to the wavelength conversion module 100', the threshold current intensity that aforesaid wavelength conversion modules 100 can bear is significantly increased. Further, as shown by FIG. 5 and Table 1, the wavelength conversion modules 100 can achieve reflectance similar to that of the wavelength conversion module 100' of the comparative example. In other words, in the foregoing embodiments, by disposing the anodized layer 130 of the substrate 110 and the diffuse reflection particles RM on the wavelength conversion module 100, heat resistance and reliability of the wavelength conversion module 100 may all be taken into account.

Figure 6:
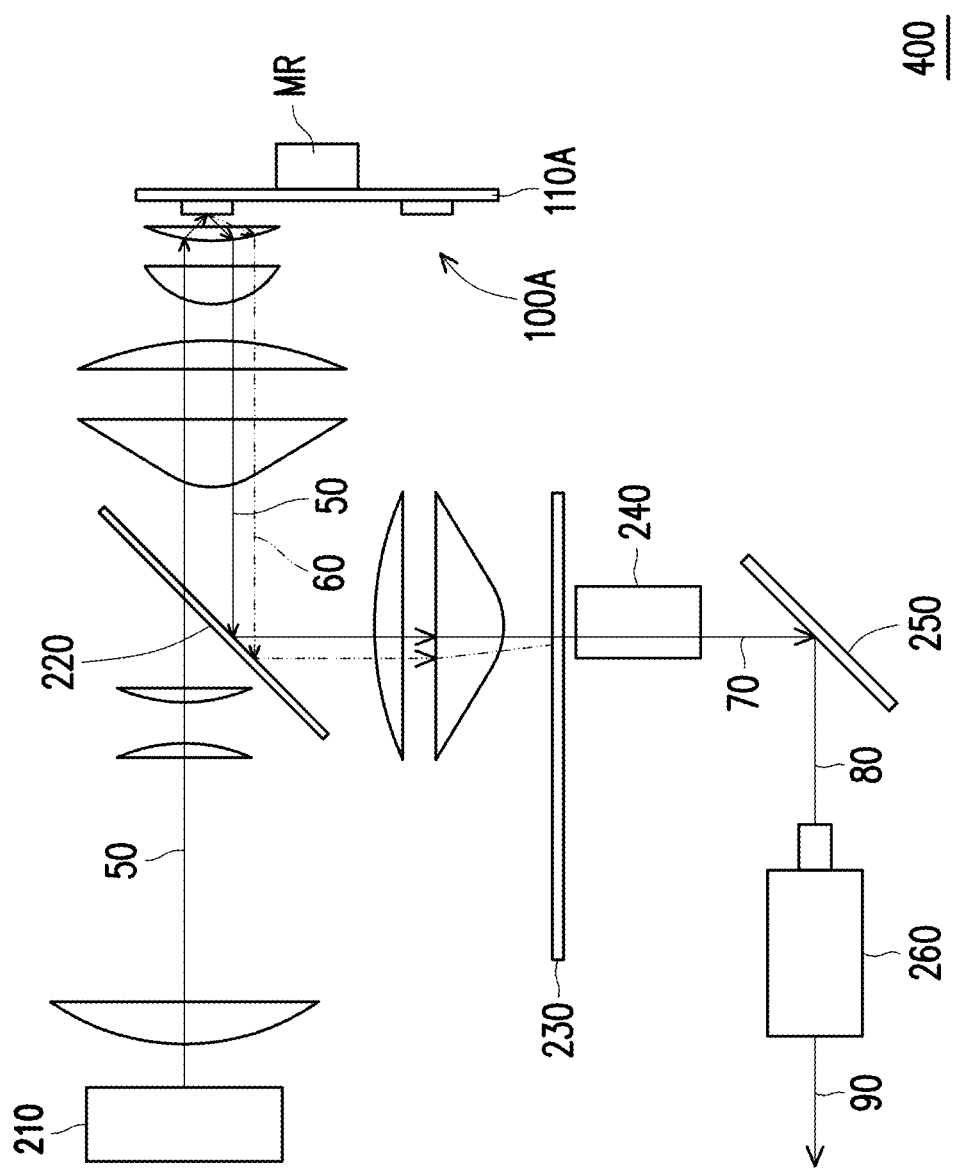
FIG. 6 is a schematic structure diagram of a projection device in another embodiment of the invention.

FIG. 6 is a schematic structure diagram of a projection device in another embodiment of the invention. With reference to FIG. 6, in this embodiment, a projection device 400 adopts a wavelength conversion module 100A, and the wavelength conversion module 100A is a reflective wavelength conversion module. The wavelength conversion module 100A is similar to the wavelength conversion module 100 except that a substrate 110A of the wavelength conversion module 100A does not have the transmissive region TR of the wavelength conversion module 100, but a reflective region (not illustrated) disposed at a position corresponding to the transmissive region TR of the wavelength conversion module 100 to reflect the excitation beam 50.

Specifically, as shown by FIG. 6, in this embodiment, when the reflective region of the wavelength conversion module 100A enters the irradiation range of the excitation beam 50, the excitation beam 50 will be reflected by the reflective region of the wavelength conversion module 100A. Next, the excitation beam 50 from the wavelength conversion module 100A may be guided to the light splitting unit 220. The light splitting unit 220 has a region that can reflect the excitation beam 50, so the excitation beam 50 can be reflected to the subsequent filter module 230. On the other hand, in this embodiment, when the at least one wavelength conversion region WR enters the irradiation range of the excitation beam 50, the excitation beam 50 is converted into the at least one wavelength converted beam 60 by the at least one wavelength conversion region WR. Afterwards, as shown by FIG. 6, the at least one wavelength converted beam 60 from the wavelength conversion module 100A may be guided to the light splitting unit 220, and reflected to the subsequent filter module 230. Then, a filter region (not illustrated) of the filter module 230 correspondingly enters the irradiation range of the wavelength converted beam 60 at different times, so as to form a red color light and a green color light, respectively. On the other hand, a transparent region (not illustrated) of the filter module 230 also correspondingly enters the irradiation range of the excitation beam 50 of the filter region 230 at different times, so as to form a blue color light and thereby form the subsequent illumination beam 70 and the image beam 80.

Accordingly, because the wavelength conversion module 100A adopted by the projection device 400 is similar to the wavelength conversion module 100 of FIG. 2C for achieving the same effect, the projection device 400 can provides similar effects and advantages of the projection device 200, which are not repeated hereinafter.

Figure 7:
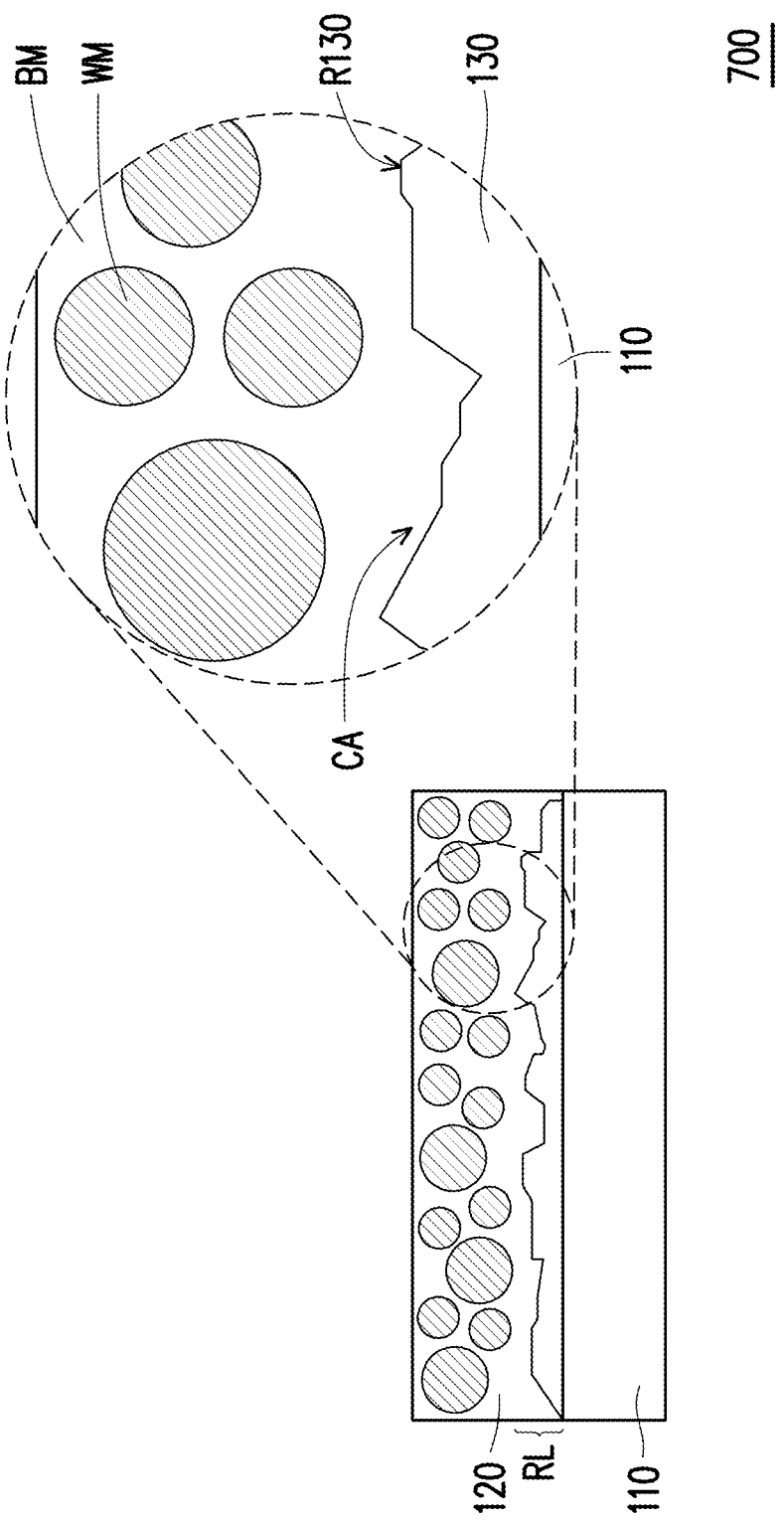
FIG. 7 is a partial enlarged view of the wavelength conversion module in an embodiment of the invention.

FIG. 7 is a partial enlarged view of the wavelength conversion module in an embodiment of the invention, with the differences as described below. A wavelength conversion module 700 of FIG. 7 is similar to the wavelength conversion module 100 of FIG. 2C, with the differences as described below. With reference to FIG. 7, in this embodiment, the wavelength conversion module 700 does not include the diffuse reflection particles, but provides the function of reflecting diffusely external light simply by using a rough surface having the micro pores CA on the anodized layer.

In this way, since the wavelength conversion module 700 can also achieve good reflectance by disposing the anodized layer 130, it is not required to refill the diffuse reflection particles RM by using the bonding material. Therefore, the risk of deterioration and burn-out on the organic bonding material due to poorly withstanding to high temperature may be avoided so good optical quality of reliability can both be taken into account. In other words, in this embodiment, by disposing the anodized layer 130 on the wavelength conversion module 700, reflectance, heat resistance and reliability of the wavelength conversion module 700 may all be taken into account. As such, effects and advantages similar to those of the aforementioned wavelength conversion module 100 can be achieved, and details regarding the same are not repeated hereinafter. Also, when the wavelength conversion module 700 is applied in the projection devices 200 and 400 described above, the projection device 200 and 400 can also achieve similar effects and advantages, which are not repeated hereinafter.

In summary, the embodiments of the invention have at least one of the following advantages and effects. In the embodiments of the invention, by disposing the rough surface of the anodized layer on the wavelength conversion module, reflectance, heat resistance and reliability of the wavelength conversion module may all be taken into account. On the other hand, in the embodiments of the invention, the projection device adopts the wavelength conversion module in which the reflective layer is formed by the process with no gelatinization. Therefore, the risk of deterioration and burn-out on the organic bonding material due to poorly withstanding to high temperature may be avoided so good optical quality and reliability can both be taken into account. In addition, according to the manufacturing method of the wavelength conversion module in the embodiments of the invention, by forming the rough surface of the anodized layer to allow the diffuse reflection particles be embedded therein, the reflective layer of the wavelength conversion module may then be manufactured by the process with no gelatinization to take both good reliability and conversion efficiency into account.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module, comprising:
   a substrate;
   an anodized layer, located on the substrate, wherein the anodized layer has a rough surface; and
   a wavelength conversion layer, formed on the rough surface, wherein the anodized layer is located between the substrate and the wavelength conversion layer, and the rough surface faces the wavelength conversion layer.

2. The wavelength conversion module according to claim 1, further comprising:
   a plurality of diffuse reflection particles, located between the wavelength conversion layer and the substrate, wherein the plurality of diffuse reflection particles is embedded in the anodized layer, a diffuse reflection surface is formed on the anodized layer, and the diffuse reflection surface faces the wavelength conversion layer.

3. The wavelength conversion module according to claim 2, wherein the anodized layer comprises a plurality of micro pores, and the plurality of diffuse reflection particles are filled in the plurality of micro pores of the anodized layer.

4. The wavelength conversion module according to claim 3, wherein a surface roughness (Ra) of the rough surface ranges between 2 μm and 20 μm.

5. The wavelength conversion module according to claim 2, wherein the anodized layer is a porous structure having a plurality of gaps, and the plurality of diffuse reflection particles are filled in the plurality of gaps of the porous structure.

6. The wavelength conversion module according to claim 5, wherein each of the plurality of gaps of the porous structure forms a hollow tubular structure.

7. The wavelength conversion module according to claim 2, wherein a particle size of each particle among the plurality of diffuse reflection particles is between 10 nm and 20 μm.

8. The wavelength conversion module according to claim 2, wherein the plurality of diffuse reflection particles increase bonds between each other and increase bonds with the anodized layer by an inorganic bonding material.

9. The wavelength conversion module according to claim 1, wherein a thickness of the anodized layer is between 20 μm and 100 μm.

10. The wavelength conversion module according to claim 1, wherein a material of the anodized layer comprises an aluminum oxide.

11. The wavelength conversion module according to claim 1, wherein a material of the substrate comprises aluminum, magnesium or a compound thereof.

12. A manufacturing method of a wavelength conversion module, comprising:
    forming an anodized layer on a substrate, wherein the anodized layer has a rough surface;
    forming a wavelength conversion layer on the rough surface, wherein the anodized layer is located between the substrate and the wavelength conversion layer, and the rough surface faces the wavelength conversion layer.

13. The manufacturing method of the wavelength conversion module according to claim 12, wherein a method for forming the anodized layer on the substrate comprises: an anodizing process, the anodized layer formed thereby being a porous structure having a plurality of gaps.

14. The manufacturing method of the wavelength conversion module according to claim 12, wherein a method for forming the anodized layer on the substrate comprises: a plasma electrolytic oxidation process or a micro-arc oxidation process, the anodized layer formed thereby having a plurality of micro pores.

15. The manufacturing method of the wavelength conversion module according to claim 12, further comprising:
    before forming the wavelength conversion layer, coating a plurality of diffuse reflection particles mixed in a fluid dispersion onto the anodized layer such that the plurality of diffuse reflection particles is embedded in the anodized layer;
    heating the fluid dispersion and the plurality of diffuse reflection particles to form a diffuse reflection surface on the anodized layer; and
    forming the wavelength conversion layer on the rough surface, wherein the diffuse reflection surface faces the wavelength conversion layer.

16. A projection device, comprising:
    a wavelength conversion module, comprising:
        a substrate;
        an anodized layer, located on the substrate, wherein the anodized layer has a rough surface; and
        a wavelength conversion layer, formed on the rough surface, wherein the anodized layer is located between the substrate and the wavelength conversion layer, and the rough surface faces the wavelength conversion layer;
    an excitation light source, configured to emit an excitation beam, wherein the excitation beam is transmitted to the wavelength conversion module and converted into an illumination beam by the wavelength conversion module;
    a light valve, located on a transmission path of the illumination beam and configured to convert the illumination beam into an image beam; and
    a projection lens, located on a transmission path of the image beam and configured to convert the image beam into a projection beam.

17. The projection device according to claim 16, further comprising:
    a plurality of diffuse reflection particles, located between the wavelength conversion layer and the substrate, wherein the plurality of diffuse reflection particles is embedded in the anodized layer, a diffuse reflection surface is formed on the anodized layer, and the diffuse reflection surface faces the wavelength conversion layer.

18. The projection device according to claim 17, wherein the anodized layer comprises a plurality of micro pores, and the plurality of diffuse reflection particles are filled in the plurality of micro pores of the anodized layer.

19. The projection device according to claim 18, wherein a surface roughness (Ra) of the rough surface ranges between 2 μm and 20 μm.

20. The projection device according to claim 17, wherein the anodized layer is a porous structure having a plurality of gaps, and the plurality of diffuse reflection particles are filled in the plurality of gaps of the porous structure.

21. The projection device according to claim 20, wherein each of the plurality of gaps of the porous structure forms a hollow tubular structure.

22. The projection device according to claim 16, wherein a thickness of the anodized layer is between 20 μm and 100 μm.

* * * * *

UNITED STATES PATENT AND TRADEMARK OFFICE
CERTIFICATE OF CORRECTION

PATENT NO. : 11,054,732 B2
APPLICATION NO. : 16/677686
DATED : July 6, 2021
INVENTOR(S) : Kuo-Chou Chang Page 1 of 1

It is certified that error appears in the above-identified patent and that said Letters Patent is hereby corrected as shown below:

On the Title Page

Item (71) Applicant should read: Coretronic Corporation, Hsin-Chu (TW)

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*